United States Patent Office 3,728,257
Patented Apr. 17, 1973

3,728,257
METHODS AND MEANS FOR REMOVING HEAVY METAL IONS FROM LIQUIDS CONTAINING SUCH IONS
Kaj O. H. Fuxelius, Billingsfors, Sweden, assignor to AB Billingsfors-Langed, Billingsfors, Sweden
No Drawing. Filed Feb. 19, 1971, Ser. No. 117,097
Claims priority, application Sweden, Feb. 9, 1971, 1,586/71
Int. Cl. B01d 15/00; C02b 1/14
U.S. Cl. 210—36                             2 Claims

ABSTRACT OF THE DISCLOSURE

The invention relates to methods and means for efficiently removing heavy metal ions from aqueous or other liquids for the purpose of purifying said liquids and/or recovering said metals; said liquids are passed through an absorbent bed which contains a solid absorbent of carbon material having at least one thiol compound pre-adsorbed thereto, said bed having been prepared by passing a liquid or gas containing or consisting of the thiol compound through said carbon material. The invention also relates to a process for producing said absorbent bed.

---

The invention relates to a method for removing heavy metal ions from liquids containing such ions, to an absorbent bed for carrying out said method, and to process for producing said absorbent bed. The invention is very useful when applied for purifying liquids, especially water, by efficiently removing said ions therefrom so as to obtain the liquids in a highly purified form. The invention is very useful also when applied in cases where said heavy metals, instead of or additionally to being practically completely removed from said liquids, are to be recovered for future use. The heavy metals as here contemplated are principally mercury, silver and/or lead.

In particular, the invention has been found extremely useful for the purification of mercury-polluted waters.

In the industrialized countries the undesirable presence of mercury in lakes and moving bodies of water such as rivers has become a matter of increasing concern. The mercury accumulating first in lower organisms living in such waters and then successively in higher organisms feeding on the lower, mercury-carrying organisms, and finally in the fish, has caused serious danger to higher animals and man consuming this fish. Its presence in the waters is considered to be caused, principally, by industrial activities such as the chlorine-alkali manufacture according to the amalgam process. Governmental authorities in such countries as the United States, Canada and Sweden have therefore become progressively and drastically stricter in their demands as to the waste water purification of these industries, following which some industries in the United States and Canada have had to close down.

The purification methods that have been developed during the last years are chiefly methods belonging of one of the following three types:

(I) Flocculation with the aid of ferric chloride and sodium sulfide and subsequent settling.
(II) Filtering over active carbon.
(III) Ion exchange.

It is not possible by any of these methods to reduce the mercury content to below 0.1–0.2 mg./liter.

According to the new demands which are being enforced in the United States and Canada, and presumably will be enforced also in other countries, the final content of mercury in the water must be very much lower than 0.1 mg./liter.

It is an object of this invention to provide a method for purifying liquids by removing therefrom heavy metal ions such as ions of mercury, silver and lead, to obtain a residual heavy metal ion content of substantially below 0.1 mg./liter. Another object of the invention is the recovery of the heavy metals thus removed to make these metals available for being used for other purposes. Still another object of the invention is to provide an absorbent bed means for carrying out said purification and/or metal recovery and to provide a process for preparing said absorbent bed means.

By the method according to the present invention, the heavy metal ions, in particular mercury ions, can be removed from polluted liquids (such as water) to an extent such that the liquid will have a residual heavy metal content of, for instance, 0.005–0.02 mg./liter. The liquid to be treated by this method may be one that has previously been purified to an insufficient degree, for example so as to still contain 0.1–0.2 mg./liter of heavy metals such as mercury. However, it is also possible by this method to purify, and/or recover metals from, liquids containing greater amounts—for instance 1–3 mg./liter or 1–5 mg./liter—of mercury or other heavy metal in ionized state, or to purify, and/or recover metals from, liquids having such heavy metal contents within the intermediate range of 0.2–1 mg./liter.

Basically, the concept of this invention resides in the use of compounds having thiol groups. Although it has been known for some time that mercury tends to attach strongly to certain thiol-containing compounds the practical utilization of this fact has caused considerable difficulties: Most of the commonly available mercaptan compounds are gases or liquids at room temperature; most of them furthermore have a very disagreeable odor; moreover, in industrial use these thiol compounds or mercaptans could not be made to remove heavy metals from liquid materials to a really efficient degree such as to give a residual heavy metal content in the liquid of say 0.02 mg./liter or lower. With the method according to the present invention such efficient degrees of heavy metal removal can be achieved, and at the same time the aforesaid difficulties are avoided; this is brought about, according to the invention, in that the liquid to be treated is passed through an absorbent bed prepared by adsorption of at least one thiol compound—preferably an alkyl, alkenyl or aryl mercaptan—to a solid absorbent material consisting chiefly of particulate carbon or of an absorbent plastics material, the thiol compound having been adsorbed to said solid absorbent material prior to the passage of said liquid through said material.

The means for carrying out this method consists of an absorbent bed comprising (a) particulate carbon and (b) at least one thiol compound adsorbed to said material (a) and consisting preferably of an alkyl, alkenyl or aryl mercaptan.

The thiol compound usually is a liquid or gas and may contain one or more thiol groups, preferably 1 or 2 of such groups. It should be noted that the thiol compound is only adsorbed on and in said material (a)—that is, the thiol compound does not combine chemically with said material (a) to form a chemical compound therewith. Among the useful alkyl and alkenyl mercaptans (having straight or branched alkyl or alkenyl groups, respectively), may be mentioned in particular those having up to 5, preferably up to 3, carbon atoms in their alkyl or alkenyl groups. Among the aromatic mercaptans those that are monocyclic aromatics may be mentioned especially. Cyclic non-aromatic mercaptans can be employed also. Mercaptans that are particularly preferred are those having the formula R—SH in which R is aryl, especially phenyl, alkenyl, especially ethenyl or propenyl, or (preferably) is alkyl, with the preferred alkyl groups being methyl, ethyl and propyl, since the higher alkyls are less strongly polar and therefore somewhat less effective.

The absorbent bed prior to being employed for the treatment of the metal-polluted liquid may be prepared by impregnating the solid absorbent with the thiol compound(s) in that said compound(s) is or are passed through the solid adsorbent in the form of either a gas or a liquid, and in this latter case the liquid may if desired be a solution, preferably one in which the solvent medium contains water together with an alcohol such as ethanol.

The solid absorbent material is usually a particle bed preferably having particle sizes within the range of 0.1–8 mm. and most preferably 0.1–5 mm. Good results have been obtained, for instance, with particle beds in which the particle sizes range from 0.1 to 1 mm. and with particle beds in which the particle sizes range from 1–5 mm. The amount of total thiol compound adsorbed to (=on and in) the solid absorbent material may vary within wide limits, being for example 0.5–50% of the weight of the solid absorbent. However, the amount adsorbed to the solid absorbent is usually about 0.5–10%, preferably 1–10% total thiol compound, based on the weight of said solid absorbent. When thus absorbed the thiol compounds have become practically unobjectionable, in that the disagreeable odor they have in themselves is almost completely eliminated.

As mentioned above the solid absorbent material may consist of carbon.

When the liquid to be treated is passed through the thiol-containing solid absorption bed the reaction that will occur between the heavy metal ions and the thiol compound may be illustrated schematically by the following equations (in the cases where the thiol compound contains one thiol group):

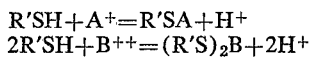

$$R'SH + A^+ = R'SA + H^+$$
$$2R'SH + B^{++} = (R'S)_2B + 2H^+$$

R' being the organic moiety of the mercaptan (for example alkyl, alkenyl, aryl etc., see above), A+ being a monovalent heavy metal (ion), for example silver, and B++ being a divalent heavy metal (ion), for example mercury.

Further details in carrying out the invention are given in the below examples which however should not be construed so as to in any way limit the invention to the detailed features thus described, these details being only illustrative.

Example 1.—Active carbon was loaded with 0.5% of ethyl mercaptan by means of adsorbing gaseous ethyl mercaptan thereto. One day later, 50 kg. of the absorbent mass thus prepared were introduced into a column and water containing 0.1–3 mg. of Hg/liter was passed through the column at a rate of 5 bed volumes per hour. After the passage of 300 CBM of water the experiment was terminated, but the efficiency of the filter had not yet decreased at this time. The water downstream of the column was found by activation analysis to have a mercury content of 0.015 mg./liter.

In this experiment the mercury absorption was found to correspond to the theoretical value of 100 g. per 62 g. of ethyl mercaptan.

When the absorbent bed is saturated with mercury the latter may be stripped off by subjecting the bed to roasting (=heating in the presence of oxygen).

Example 2.—50 kg. of active carbon consisting of 1 x 5 mm. particles (gas absorption carbon) were loaded with 250 mg. of ethyl mercaptan, the mercaptan being passed therethrough in gaseous state for 24 hours. The mercaptan-containing carbon material thus obtained was filled into a conventional 40 x 200 cm. column. Waste water which had been discharged from a chlorine-alkali plant, had been treated with an oxidant for ionization of its metal content, and had been passed through an ion exchanger, was then passed through the absorption column described above. Analyses over a three-week period showed that the mercury content varied between 0.005 and 0.02 mg./liter.

Example 3.—The method of Example 2 was repeated except that in this case methyl mercaptan was employed instead of ethyl mercaptan. The same effect was obtained.

Example 4.—The method of Example 2 was repeated except that in this case the carbon was loaded with 1000 g. of ethyl mercaptan. The length of the useful life of the absorbent bed corresponded to the theoretical value.

Example 5.—An absorption mass was prepared in the following manner: Active carbon having a particle size of 0.5–1 mm. was allowed to adsorb propyl mercaptan dissolved in a water-ethanol mixture until its weight had increased by about 10%. The mercaptan-loaded carbon mass thus obtained was introduced into a conventional ion exchanger column to a 1000 mm. bed height level. Water containing 2 mg./liter of silver in the form of silver nitrate was flowed through the bed at a rate of 5 bed volumes per hour. No silver could be detected in the effluent water (analysis according to the ditizone method).

I claim:
1. A method of treating a liquid to remove heavy metal ions contained therein, said heavy metal ions being selected from the group consisting of mercury ions, silver ions, and lead ions, comprising the step of passing said liquid through a two-component absorbent bed comprising (a) an absorbent material consisting of solid particulate carbon and (b) a thiol compound adsorbed on said absorbent, said thiol compound having the formula R—SH in which R is selected from the group consisting of aryl, $C_1$ to $C_5$ alkyl, and $C_2$ to $C_5$ alkenyl.

2. A method according to claim 1, in which said thiol compound (b) is selected from the group consisting of methyl mercaptan, ethyl mercaptan, propyl mercaptan and thiophenol.

References Cited

UNITED STATES PATENTS

| | | | |
|---|---|---|---|
| 3,110,712 | 11/1963 | Hill et al. | 210—36 X |
| 3,473,921 | 10/1969 | Schmuckler | 260—2.2 R |
| 2,716,113 | 8/1955 | Axe | 210—36 X |
| 2,891,916 | 6/1959 | Hwa | 260—2.2 R |
| 3,044,969 | 7/1962 | Seifert | 260—2.2 R |

SAMIH N. ZAHARNA, Primary Examiner

T. G. WYSE, Assistant Examiner

U.S. Cl. X.R.

210—38, 502